July 30, 1940.  R. H. GORDON  2,209,915
CONVEYER MECHANISM
Original Filed Nov. 15, 1937
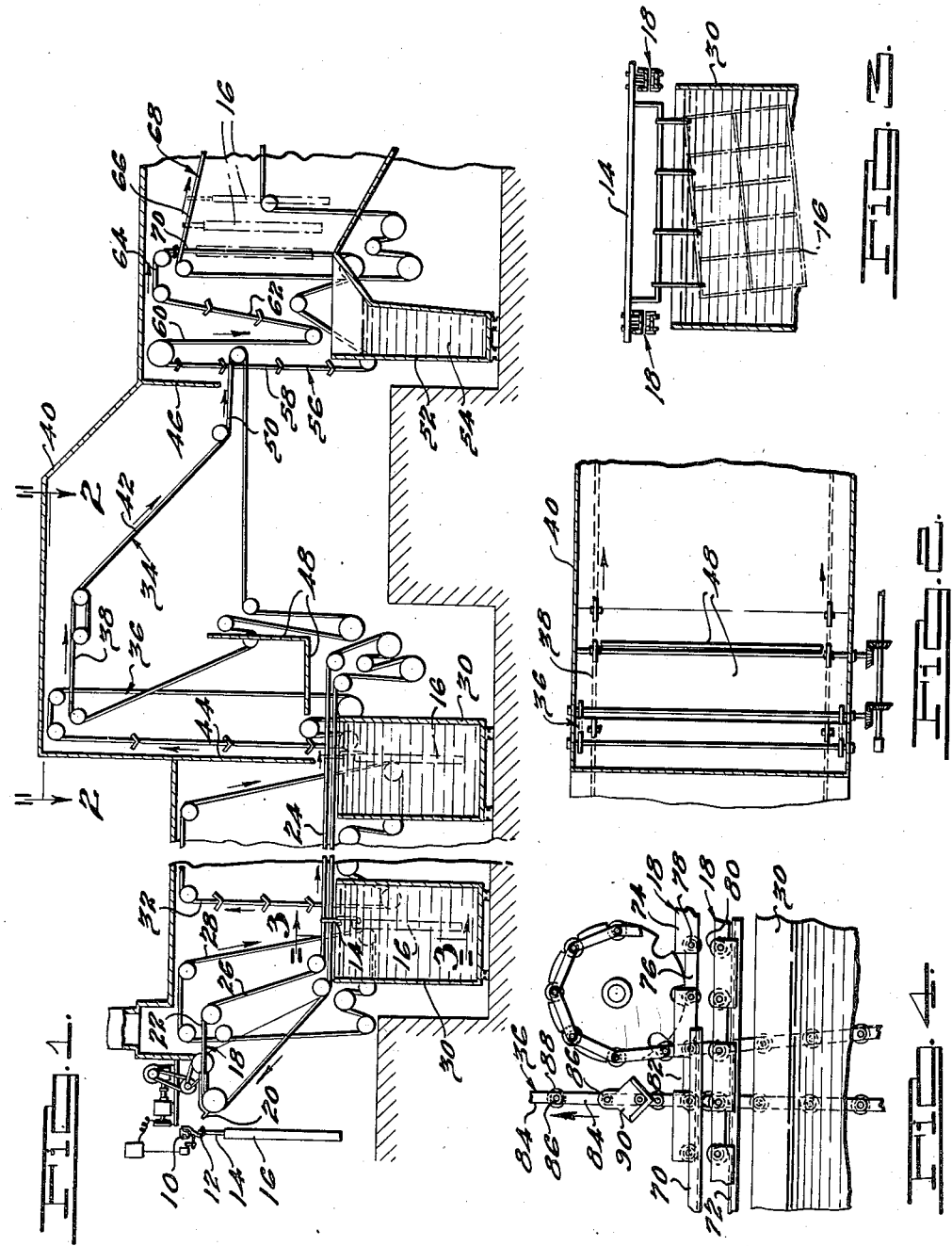
INVENTOR
Robert H. Gordon.
BY Harness, Dickey & Pierce.
ATTORNEYS.

Patented July 30, 1940

2,209,915

UNITED STATES PATENT OFFICE 2,209,915

CONVEYER MECHANISM

Robert H. Gordon, Detroit, Mich., assignor to Parker Rust-Proof Company, Detroit, Mich., a corporation of Michigan Original application November 15, 1937, Serial No. 174,614, now Patent No. 2,138,095, dated November 29, 1938. Divided and this application July 5, 1938, Serial No. 217,409

6 Claims. (Cl. 214—17)

This invention relates to conveyer mechanisms and particularly to that type thereof including endless chains to which articles to be transferred and/or treated are suspended, and is a division of my application for Letters Patent of the United States filed November 15, 1937, for improvements in Conveyer mechanism, Ser. No. 174,614, now Patent No. 2,138,095.

Objects of the invention are to provide a conveyer mechanism having certain novel features of construction by means of which certain installations may be constructed of a minimum length, by which articles may be transported at maximum speed, and which results in economy in installation and operation; to provide a conveyer mechanism including a plurality of double rail or chain portions arranged at different elevations, together with transfer mechanism for effecting transfer of articles from one elevation on one pair of chains to another elevation on another pair of chains thereby to permit a shortening of the overall length of said mechanism as compared to conventional installations; to provide transfer mechanism including a plurality of relatively slowly moving main conveyer chain portions, cooperating portions of which are arranged at different elevations, in combination with relatively fast moving transfer chain portions arranged to transfer articles from one of the main chain portions to another of the main chain portions located substantially directly above it, thereby preventing piling up of articles between said portions and permitting a material shortening of the overall length of the conveyer; and the provision of a method of shortening a double chain conveying mechanism wherein certain portions of the mechanism are arranged at different elevations, comprising forming the main conveyer chain portion as independent units and operatively connecting cooperating portions thereof arranged at different levels by a relatively fast moving transfer chain mechanisms.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a more or less diagrammatic partially broken, partially sectioned side elevational view of a conveying mechanism embodying the improved features of the present invention;

Fig. 2 is a fragmentary sectional view taken on the line 2—2 of Fig. 1 and illustrating a certain portion of the conveying mechanism thereof in plan view;

Fig. 3 is a transverse sectional view taken on the line 3—3 of Fig. 1 and illustrating one of the articles being transferred by the conveyer mechanism;

Fig. 4 is an enlarged fragmentary view illustrating in more detail the preferred construction of certain portions of the mechanism.

Referring to the drawing and particularly to Fig. 1 the numeral 10 indicates generally a mono-rail conveying system including a plurality of hooks 12 from which are suspended carriers 14 for articles 16 to be treated. The articles 16 are subjected to a certain operation while being transported on the mono-rail system 10 and when they reach a certain point in the path of travel of the mono-rail system are transferred to a double rail conveying system including a pair of parallel runs of chains 18 by means of a transferring apparatus including arms 20 having hook-shaped ends, all as disclosed in my Letters Patent of the United States No. 2,103,901, issued December 28, 1937, on Conveyer mechanism, and in which such transfer mechanism is shown and claimed in detail.

The double rail conveyer chains 18 each comprise an upper run including an upper horizontally extending portion 22 and a lower horizontally extending portion 24 connected together by means of a relatively steeply inclined portion 26, and article carriers delivered to the upper portion 22 from the mono-rail system 10 being removed from the upper portion 22 and delivered to the lower portion 24 by means of a relatively fast moving pair of transfer chains 28 in accordance with the detailed description thereof contained in my co-pending application Serial No. 174,614 above identified and of which the present application constitutes a division.

The articles which are delivered by the transfer chain 28 to the lower portion 24 of the upper run of the double conveyer chains 18 are, when resting upon such lower portion 24, immersed in the liquid bath contained in one of a plurality of tanks 30 arranged one after the other and which may contain in order, by way of illustration, hot water, rust proofing solution, cold water, and an acid rinse, respectively, to each of which the articles carried by the double rail conveyer 18 are destined to be subjected in turn.

In order to transfer the holders 14 and the articles 16 thereby from one tank 30 to the next succeeding tank 30 in the direction of movement of the upper run of the conveyer chains 18 without undue length of the various tanks 30 and undue time in transfer between adjacent tanks, a pair of cooperating transfer chains 32 are provided at the ends of each adjacent pair of tanks so as to lift the holders 14 and the articles 16 carried thereby from the conveyer chains 18 as they approach, in a horizontal direction, a side of such tank, lift them upwardly a sufficient distance to permit the lower edge of the article to clear the top of the tanks, then transfer the articles horizontally to a point over the adjacent edge of the adjacent tank and then again lower them into such adjacent tank and again deposit the carrier upon the conveyer chains 18 for movement of the articles through such adjacent tank.

After an article has reached the end of the last tank it is then necessary to remove it from such tank and it is preferable to then subject it to a suitable drying operation. In the past it has been conventional practice for the main and relatively slowly moving conveyer chains 18 to extend upwardly from a point above the last tank so as to carry the article immersed in the last tank upwardly therewith and through a suitable drying hood or oven. It will be appreciated by those skilled in the art because of the relatively slow rate of movement of the main conveyer chain, where the conventional practice is followed in the respect mentioned, it is necessary that the upward angularity of the main conveyer chain from the last tank be not too abrupt for otherwise the articles which are carried in relatively closely spaced relationship upon the main conveyer chain will be piled up one against the other on the inclined portion. This limitation of the angularity of the main conveyer chain to avoid piling up of the articles carried thereby has the effect of making the conveying system unduly long and it is the particular province of the present invention to provide a construction in which the holders and the articles carried thereby may be transferred from the main conveyer chain as they approach the end of the last tank and be quickly elevated, to a point directly above the last tank if desired, and then be passed through a drying hood or oven at a relatively slow rate without any danger of piling up of the articles one upon the other.

This is accomplished by terminating the main conveyer chains 18 at or slightly beyond the end of the last tank 30 as indicated. A second set of main conveyer chains indicated generally at 34 are then provided with the forward end thereof spaced above the upper end of the last tank 30 by a distance substantially greater than the distance between the tops of the supports 14 and the bottoms of the articles 16 carried thereby and providing a pair of relatively fast moving transfer chains 36 for picking up the carriers and the articles carried thereby from the main conveyer chains 18 and depositing them upon the upper horizontal run 38 of the second set of main conveyer chains 34. It will be understood that the main conveyer chains 34 are positioned within a drying oven or hood 40 in which the air is kept at a temperature and at a degree of humidity favorable to the rapid drying of the articles being transported therethrough.

The relative inclination of travel of the articles on the conveyer chains 34 once they are deposited upon the upper horizontal run 38 thereof is more or less unimportant in accordance with the broader aspects of the present invention, but in accordance wth a narrower phase thereof it is preferable that they travel down a downwardly inclined portion 42 for the reason that in such case the hood or oven 40 may be provided with downwardly extending skirts or shields 44 and 46 at the respective opposite ends thereof together with cooperating baffle members 48 at the discharge side of the last tank 30, so as to prevent undue circulation of the heated air within the hood or oven 40 and particularly in the upper portion thereof and consequent loss of heat therefrom.

In the particular arrangement of parts shown in the drawing by way of illustration the downwardly inclined portion 42 of the conveyer chains 34 extends to a lower horizontal run portion 50 which extends to a point substantially over the upper edge of a tank 52 containing a supply of paint or paint-like material 54 with which it is desired to coat the article 16 after having been dried in the oven 40. The run portion 50 is positioned a distance above the upper edge of the tank 52 by a distance less than the distance from the top of one of the carriers 14 to the bottom of the article 16 carried thereby so that the carriers and the articles supported thereby must be raised prior to immersing the articles in the material 54 in the tank 52. Likewise it is only necessary that the articles be momentarily dipped in the material 54 to provide them with the desired coat and, accordingly, a pair of transfer chains indicated generally at 56 are provided for this purpose. The transfer chains 56 each include an upwardly moving run 58 directed upwardly past the discharge end of the lower horizontal run portion 50 of the conveyer chains 34, a downwardly moving run 60 which is adapted to carry the supports 14 and the articles 16 carried thereby downwardly to a position in which the articles 16 are immersed within the bath 54 in the tank 52, an upwardly moving run 62 which is adapted to raise the articles 16 from the bath 54 in the tank 52, a horizontally directed run 64 adapted to carry the supports 14 over the generally horizontally extending runs 66 of another set of main conveyer chains indicated generally at 68, and a downwardly moving run 70 adapted to deposit the carriers 14 upon the runs 66. This last portion of the mechanism including the transfer chains 56 and main conveyer chains 68 form no part of the present invention but do form the subject-matter of my co-pending application for Letters Patent of the United States filed on even date herewith, Serial No. 217,410 for improvements in Conveyer mechanism and also forming a division of my said co-pending application for Letters Patent of the United States Serial No. 174,614 above referred to.

It will, of course, be understood that the various main conveyer chains 18, 34 and 68 and the various transfer chains 28, 32, 36 and 56 are all suitably driven in timed relation with respect to each other and with the various transfer chains moving at a materially higher rate of speed than the main conveyer chain all in accordance with conventional practice relative to main conveyer chains and transfer chains in general. It will also be understood that while any suitable construction of main conveyer chains and transfer chains are adapted for use in connection with the present invention, that type specifically illustrated in Fig. 4 is preferred.

Referring to Fig. 4 one of the main conveyer chains 18 is illustrated with the upper run thereof riding in an upwardly opening supporting channel 70 and the lower run thereof riding in an upwardly opening channel 72. The conveyer chain is made up of alternate deep and shallow links 74 and 76, respectively, the lower faces of all of which in the upper runs are in substantially aligned relation and with cooperating ends pivotally connected together by means of pins 78. Rollers 80 carried by the pins 78 project below the lower face of the upper run of the chains 18 to thus provide a rolling support for the various links 74 and 76 on the bottom of the channels 70. The use of alternate deep and shallow links provides pockets or recesses 82 between adjacent deep links for reception of the ends of the supports 14.

The construction of the transfer chain 36 is indicative of the construction of all of the transfer chains employed in the construction and as illustrated in Fig. 4 includes a plurality of cooperating links 84 the adjacent ends of which are pivoted together by means of pins 86 and which pins carry rollers 88 projecting beyond opposite faces of the links 84 for the purpose of providing rolling support on suitable supporting channels or tracks not shown. At predetermined intervals in the length of each of the transfer chains 36 a bucket 90 is pivotally mounted on the inner end of a cooperating pin 86 for reception of the corresponding outer end of the carrier 14, so that in passing upwardly past the outer side of one of the main conveyer chains the buckets will lift one of the supports 14, and the article 16 carried thereby, from the main conveyer chain and deposit it at a different point thereon or on a different main conveyer chain.

Formal changes may be made in the specific embodiments of the invention described without departing from the spirit or substance of the broad invention, the scope of which is commensurate with the appended claims.

What I claim is:

1. In a conveyer system, in combination, a pair of endless conveyer chains arranged in parallel relation and arranged to support a plurality of pieces of work of relatively great vertical dimension in pendant position and in closely spaced relationship between them, means for driving said chains at the same rate of speed, each of said chains including an upper run and lower run and said upper run of each including a horizontal end portion, a second pair of conveyer chains arranged in spaced parallel relationship with respect to each other and extending beyond said horizontal end portions of the first mentioned chains and similarly arranged to support said workpieces, said second pair of chains each having a horizontally extending end portion arranged in vertically spaced relation with respect to the horizontal end portions of the first mentioned chains, means for driving said second pair of chains, a pair of transfer chains one of each of which cooperates between one chain of each of the two previously mentioned pairs of chains, said transfer chains including an approximately vertically directed portion associated with the horizontal end portion of one chain of the two first mentioned pairs of chains and another approximately vertically directed portion cooperating with the horizontal end portion of one chain of the other of said two first mentioned pairs of chains, means for driving said transfer chains in timed relation with respect to said two first mentioned pairs of chains but at a higher rate of speed, and means on said transfer chains for removing a piece of work supported between the horizontal portions of one of said two first mentioned pairs of chains and depositing said work between the horizontal portions of the other of said two first mentioned pairs of chains, said last mentioned means comprising a plurality of devices spaced sufficiently far from each other on said transfer chains to prevent contact between adjacent pieces of work as said pieces are removed and deposited.

2. In combination, a pair of conveyer chains arranged in spaced parallel relation and arranged to support a plurality of pieces of work of relatively great vertical dimension in pendant position and in closely spaced relationship, a second pair of conveyer chains arranged in spaced parallel relation and similarly arranged to support said workpieces, end portions of said pairs of conveyer chains being arranged one above the other with one of said pairs of conveyer chains extending in one horizontal direction from said adjacent ends and the other of said pairs of conveyer chains extending in the opposite direction from said ends, a pair of substantially vertically extending transfer chains each of which cooperates between one chain of each of the two first mentioned pairs of chains, means for driving all of said chains in timed relation and said transfer chains at a greater rate of speed than said two first mentioned pairs of chains, and means on said transfer chains for removing a piece of work supported between the chains of one of the two first mentioned pairs of chains and depositing it between the chains of the other of said two first pairs of chains, said last mentioned means comprising a plurality of devices spaced sufficiently far from each other on said transfer chains to prevent contact between adjacent pieces of work as said pieces are removed and deposited.

3. In combination, a series of tanks arranged in end to end relationship, a drying hood arranged above and beyond one end of the end one of said tanks, a pair of conveyer chains arranged in spaced and parallel relation with at least a portion of the upper run of each of said chains arranged adjacent and in a plane above the top of said tanks, a second pair of conveyer chains arranged in spaced and parallel relation each having at least a portion of the upper run thereof arranged in vertically spaced, and extending into approximately vertically aligned, relation with respect to a portion of said end one of said tanks within the upper portion of said drying hood, means for driving all of said conveyer chains in timed relation with respect to each other, quick transfer means between adjacent ends of adjacent tanks adapted to remove articles from the first pair of conveyer chains at the discharge end of one tank and return it to said first pair of conveyer chains over the entering end of the next adjacent tank; a pair of transfer chains each having an approximately vertically extending run travelling from a point adjacent the upper end of said end one of said tanks to a point within the upper portion of said drying hood, said transfer chains cooperating between the first mentioned pair of conveyer chains and the second mentioned pair of conveyer chains to transfer articles supported on the first mentioned pair of conveyer chains out of said tank to said second pair of conveyer chains within the upper portion of said drying hood, and means for driving said transfer chain in timed relation with but at a higher rate of speed than either of said pairs of conveyer chains.

4. In combination, a plurality of tanks adapted to contain a liquid and arranged in end to end relationship, a pair of conveyer chains each including an upper run at least a portion of which extends in a generally horizontal direction above the upper edge of said tanks at opposite sides thereof, holders adapted for support on said conveyor chains and to support an object in immersed condition in said tanks when supported on said conveyor chains thereabove, a drying hood extending into vertically spaced relation with respect to the end one of said tanks and that portion of said conveyor chains located above said end one of said tanks, a second pair of conveyer chains each including an upper run having at least a portion thereof extending in a generally horizontal direction and having one end thereof approximately vertically aligned with one end of said one of said tanks, quick transfer means at adjacent ends of adjacent tanks operable to lift said holders and objects carried thereby from the first mentioned pair of conveyer chains over the ends of said tanks and deposit said holders on said first mentioned conveyer chains over the entering end of the next adjacent tank, a pair of transfer chains one located at each side of said one of said tanks and each including a vertically extending run traversing the path of movement of the first mentioned conveyer chains within the longitudinal limits of said one of said tanks and a downwardly extending run traversing the plane of movement of said horizontal portion of said second set of conveyer chains within the upper portion of said drying hood, means carried by said transfer chains for removing one of said holders from the first mentioned pair of conveyer chains and the object carried thereby from immersed condition in the liquid in said one of said tanks and depositing said holder upon said horizontal portion of said second pair of conveyer chains within the upper portion of said drying hood, and means driving said conveyer chains and said transfer chains in timed relation with respect to each other and said transfer chains at a higher rate of movement than said conveyer chains.

5. In combination, a tank adapted to contain a liquid, a pair of conveyer chains each including an upper run at least a portion of which extends in a generally horizontal direction above the upper edge of said tank at opposite sides thereof, holders adapted for support on said conveyor chains and to support an object in immersed condition in said tank when supported on said conveyor chains thereabove, a drying hood extending into vertically spaced relation with respect to said tank and that portion of said conveyor chains located above said tank, a second pair of conveyer chains each including an upper run having a portion thereof extending in a generally horizontal direction and having one end thereof approximately vertically aligned with one end of said tank, another portion of said upper run of said second pair of conveyer chains including a downwardly directed and downwardly moving portion, and still another portion of the upper run of said second pair of conveyer chains including a horizontally directed portion arranged in a plane spaced vertically with respect to the plane of the first mentioned horizontally directed portion of said second pair of conveyer chains, a pair of transfer chains one located at each side of said tanks and each including a vertically extending run traversing the path of movement of the first mentioned conveyer chains within the longitudinal limits of said tank and a downwardly extending run traversing the plane of movement of the first mentioned of said horizontal portions of said second set of conveyer chains within the upper portion of said drying hood, means carried by said transfer chains for removing one of said holders from the first mentioned pair of conveyer chains and the object carried thereby from immersed condition in the liquid in said tank and depositing said holder upon said horizontal portion of said second pair of conveyer chains within the upper portion of said drying hood, and means driving said conveyer chains and said transfer chains in timed relation with respect to each other and said transfer chains at a higher rate of movement than said conveyer chains.

6. In combination, a plurality of tanks arranged in end to end relationship and adapted to contain liquids for treating articles, a pair of conveyer chains arranged in spaced parallel relation with the upper runs thereof adjacent to and parallel with the upper edges of said tanks, spaced pairs of transfer chains arranged at adjacent ends of adjacent tanks for removing articles submerged in said tanks from said conveyer chains at the discharge end of one tank, lifting said articles over the adjacent ends of said adjacent tanks and re-depositing said articles on said conveyer chains over the entering end of the next adjacent tank, means for driving said conveyer chains and transfer chains in timed relation but said transfer chains at a materially higher rate of speed than said conveyer chains, a second pair of conveyer chains arranged in substantially coplanar relationship with respect to the first mentioned conveyer chains and with the receiving ends thereof in vertically spaced and substantially vertically aligned relation with respect to the discharge ends of said first mentioned conveyer chains, means for driving said second pair of conveyer chains at approximately the same speed as said first mentioned conveyer chains, an additional pair of transfer chains, one associated with one of each of said pairs of conveyer chains and including a vertical run extending between them adapted to remove articles from the discharge end of said first mentioned conveyer chains and from the liquid in the said tank associated therewith and deposit them upon the receiving end of said second pair of conveyer chains, and means for driving said additional pair of transfer chains in timed relation with but at a higher rate of speed than said conveyer chains.

ROBERT H. GORDON.